Dec. 19, 1950     I. SILVERMAN     2,534,310

DROP DISPENSING CONTAINER

Filed May 29, 1948

INVENTOR.

Irving Silverman

BY

Lackenbach & Hirschman

ATTORNEYS

Patented Dec. 19, 1950

2,534,310

UNITED STATES PATENT OFFICE 2,534,310

DROP DISPENSING CONTAINER

Irving Silverman, Brooklyn, N. Y.

Application May 29, 1948, Serial No. 30,007

6 Claims. (Cl. 222—420)

The invention relates to a dropper for medicines, such as eye drops or nose drops, but may be used for dispensing other liquid chemicals, for instance, in the laboratory where a measured small amount of liquid is to be dispensed. More particularly, the invention relates to a sanitary, self-storing dispenser for discharging a measured quantity of a liquid, for instance, one or more drops of a medicine, into the eye or nostril.

The primary object of the invention is to provide a novel, simple, inexpensive and practical medicine dropper in which not only may a quantity of medicine or other liquid chemical be safely stored, but which is so constructed as to make possible, by the simple application of a squeezing pressure upon an elastic bulb, the discharging within the structure itself, of a measured quantity or number of drops of the medicine from the storage vessel to a measuring chamber, forming a part of the structure, and thence dispensing the desired and predetermined amount of the medicine or other liquid chemical from the measuring chamber, where its amount or volume may be easily controlled and checked before it is discharged from the dropper.

A more particular object of the invention is to provide a structure whereby only the measured and desired quantity of the liquid is discharged from the storage vessel into the dispensing chamber without the danger of more than the desired amount being dispensed from the dropper, irrespective of the degree or amount of pressure applied to the bulb, and to make possible the immediate or subsequent use of the dropper without the necessity of its sterilization or resetting in any manner.

The invention is of particular utility for what is generally referred to as a nose-dropper for the reasons that the dropper may be so inexpensively manufactured as to be practicable for use as a sales container for the nose drops with which it is loaded and to be thrown away after all drops have been discharged, and that the invention provides a nose-dropper, the temporary measuring chamber of which serves adequately as the nozzle for the discharge of medicine into the nostril, and further that it is so constructed that it will not permit entry of infectious or contaminating matter into the storage supply within the dropper. The measuring chamber is so constructed that it may be disinfected without at the same time causing the disinfectant to reach the storage supply, and thus the measuring chamber may be safely used as the dispensing nozzle for a plurality of patients requiring treatment of the nasal passages.

The advantages of my novel structure will be readily apparent to those skilled in the art, but may be briefly summarized by comparing its manner of utilization with that of the conventional medicine dropper now being used. Such conventional medicine dropper, which comprises a glass tube with a restricted discharge nozzle and an elastic bulb, after being used, is generally replaced into the bottle and carries with it many germs from the nose of the user or contamination by exposure to the air. After several applications in this manner, the contents of the bottle to which the dropper has been replaced become contaminated. The conventional medicine dropper as now constructed is clearly not adapted for use by several persons or infrequent use over a period of time. As distinguished from this conventional type of dropper, my novel structure includes a dispensing tube terminating in the nozzle as an exterior part of the structure, with the medicinal liquid contained wholly within the dropper and not subject to contamination by contact of the portion of the dropper which has entered the nostril of the user.

In the case of infants, the utilization of the conventional medicine dropper is fraught with particular difficulty in attempting to count the drops as they fall into the child's nostril. The normal child, being temperamentally incapable of holding still for any length of time, repetition of the medicine, when required, is virtually impossible.

The dropper constructed in accordance with my invention makes possible the transfer of a desired and predetermined quantity, for instance, a definite number of drops, of the medicinal preparation from the storage vessel thereof to the dispensing chamber and then the ejection of that measured quantity or dosage of the medicinal preparation in a single squirt, by the application of pressure to the elastic bulb. Only the measured amount of the liquid will be dispensed through the nozzle of the dropper, it being impossible to dispense more of the liquid than has been discharged from the storage vessel to the measuring chamber. With my device, therefore, no over-dosage is possible as after the desired and prescribed amount of drops are carried into the measuring chamber, where the amount to be ejected is clearly visible and can be checked by a graduated scale thereon, no more than the amount so desired and prescribed can be ejected at a single time.

In the accompanying drawing I have illustrated a specific embodiment of my novel construction of medicine dropper to illustrate its principle of operation.

In its broadest aspects, the dropper consists of a sanitary, self-storing dispenser for a measured quantity of a medicinal preparation, such as eye or nose drops, in which is utilized an elongated storage vessel, sealed at the top with a stopper and having two tubes, one inside the other, the interior tube extending below the storage vessel and terminating in a constricted nozzle, with an elastic bulb integral with the stopper, which bulb, by the application of external pressure thereto, for instance by pinching and releasing it in the conventional manner, will create a partial vacuum in the passage between the tubes when the lower end of the nozzle is closed with a finger, causing a quantity of the liquid contained in the storage vessel to be withdrawn by suction and passed to the measuring chamber and from thence to be ejected through the dispensing nozzle, in a single squirt of the entire contents of such measuring chamber.

The preferred embodiment of my invention, illustrated by way of example rather than by way of elimination, is shown in the accompanying drawings in which Fig. 1 is an outline of a preferred embodiment of the invention, with outlines of internal parts shown dotted;

Figure 2:
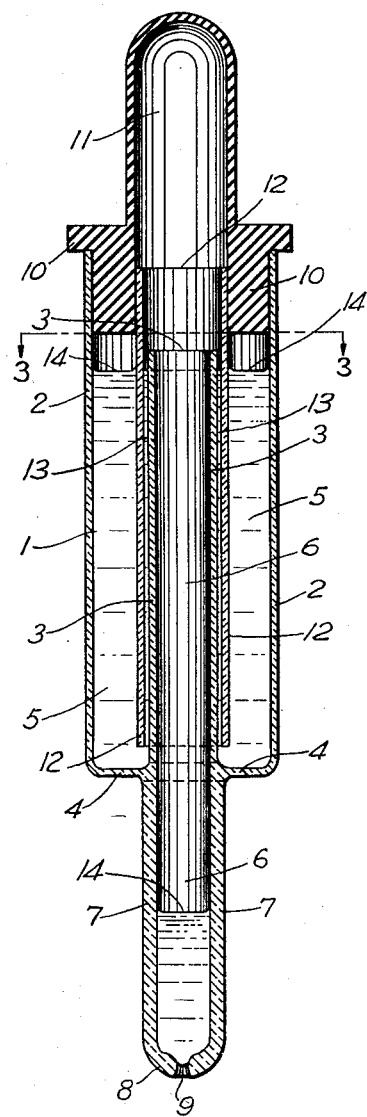
Fig. 2 is an enlarged axial section of the embodiment.
Figure 3:
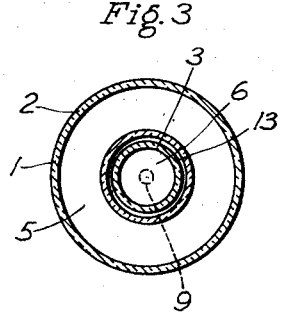
Fig. 3 is the section 3—3 of Fig. 2.

The preferred embodiment of the invention illustrated in the drawing is essentially a syringe of special construction which is clearly shown in axial section in Fig. 2.

The body of the dropper comprises a double-walled vessel 1, preferably of glass, although this, and the interior tube hereinafter described, may be made of a plastic or composition material not affected by the liquid contained therein. The outer wall of the vessel is designated 2, the inner wall 3. Both are cylindrical and coaxial, as shown, the diameter of the inner wall being considerably less than that of the outer wall. Also, the inner wall is of somewhat less height than the outer wall. The vessel 1 is made as an integral unit of its inner and outer walls and depending tube, the inner and outer walls being connected at their lower extremities by a connecting wall 4 which serves as the bottom of an annular chamber 5 adapted to carry a storage load of medicine or other liquid chemical. The chamber 6 within the inner wall 2 is continued beyond the connecting wall 4 to form a tube 7, coaxial with the vessel 1 and of inner diameter equal to that of chamber 6. The wall of tube 7 is shown to be somewhat thickened with respect to walls 2 and 3. The lower end of tube 7 is nearly closed at 8, forming a nozzle having a small opening 9 therein, after the usual practice followed in the manufacture of nozzles for nose-droppers.

The vessel 1 is provided with a cap in the form of a stopper 10, which is a flanged annulus, the outer surface of the annulus being arranged to fit snugly within the outer wall 2 of vessel 1, with the flange of the stopper in abutment with the upper edge of the wall 2. Coaxially extending above the stopper 10 is a bulb 11 made integral with the stopper in the usual manner. The stopper and bulb are preferably of rubber. Forced into the perforate center of the stopper 10 is a tube 12, preferably of glass, although it may also be constituted of a plastic or composition material, of an inside diameter slightly greater than the outside diameter of inner wall 3 of vessel 1, and of length such that when the stopper is in place, as shown in Fig. 2, the lower end of the tube 12 nearly meets the connecting wall 4.

The annular passage from the lower end of tube 12 and the upper end of the inner wall 3, and between said tube and wall, is designated 13. Liquid within the dropper is designated 14. On the outside of tube 7, I provide a volumetric scale 15 which may be etched or scratched into the glass surface.

If the dropper is to be utilized as the sales container for, say, nose drops, a suitable cap, as of rubber, may be employed for sealing the end of the nozzle and to prevent oxidation and evaporation of the chemical stored within the chamber 5. No such cap is shown as a cap of this kind is well known. Under normal circumstances, the liquid contained in chamber 5 will not drain out of chamber 5 through passage 13 and into chamber 6, and so discharge through the opening 9, irrespective of the position in which the dropper is placed.

Figure 1:
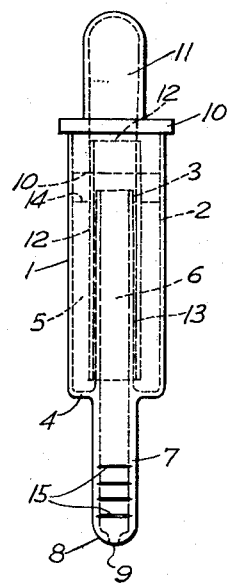

If the dropper is placed vertically as shown in Figs. 1 and 2, and the bulb 11 is not compressed, and the seal of the stopper 10 assumed to be perfect, the liquid within chamber 5 tends, by a combination of capillary attraction and the normal tendency of liquid to seek a common level in any container, to ascend the passage 13, but the liquid does not spill over the top of wall 3 into chamber 6; further, the atmosphere within chamber 5 above the top of the liquid and below the stopper 10 must necessarily be thinned to permit of any syphon flow of the liquid into chamber 6. So, normally the liquid stored in chamber 5 remains there. To cause the fluid to move through passage 13 into chamber 6 it is first necessary to close the opening 9 by pressure against the finger or a rubber surface. Compressing the bulb 11 now increases the air pressure in chamber 6 and forces air into passage 13 and then into chamber 5 where it rises to the surface. Now, when pressure on the bulb 11 is released, but the pressure on the opening 9 is maintained, a suction action results whereby a few drops of fluid move through passage 13 and overflow into chamber 6 and fall to the bottom of chamber 7. If the pressure on the opening 9 is now removed, the fluid in the bottom of chamber 7 will not escape as the surface tension of the liquid will prevent it from discharging through opening 9.

The amount of fluid dispensed may be measured by means of the volumetric scale 15. The markings of the scale may of course relate to drops, so that the dispenser is able to have the exact desired dosage within tube 7 before the collected liquid therein is discharged by an abrupt compression of bulb 11.

It will be apparent from a study of Fig. 2, particularly, that infectious and contaminating matter entering tube 7 through the opening 9 cannot normally reach the liquid within the chamber 5. Also, that a sterilizing liquid drawn into tube 7 through opening 9 for the purpose of cleansing the inside of chamber 6 may be discharged therefrom as waste, leaving the tube 7 for receiving another dosage of the liquid within chamber 5.

If not enough liquid is drawn from the storage vessel 5, into the measuring chamber 6 by a single pinching or compression of the bulb 11, additional drops may be transferred by a slight additional or repeated pressure on the bulb. Once the desired amount is withdrawn, into chamber 7, the pressure on the nozzle at 9 is removed and the compression of the bulb 11 will eject the entire contents of the measuring chamber, through nozzle 9, in a single squirt.

One of the outstanding features of the dropper is the safety feature. One may compress and release the bulb a hundred times, fast or slow, and no fluid will move from the storage container into the discharging chamber, but only the discharging chamber will be emptied of any fluid previously put into it.

The discharging chamber can only be filled if the lower open end of it is first closed. Then, the pressure on the bulb will force air into the storage container and releasing the pressure on the bulb will result in flow of fluid into the discharging chamber. When the free end of the system is kept closed, so no air can escape, then and only then, will alternate compression and relaxation of the rubber bulb result in a flow of fluid from the storage container into the discharging chamber. Fluid will flow out of the storage container only during the suction phase and suction is impossible as long as the opening at 9 is left open. Hence the safety feature is apparent when the drops are being discharged into the patient's nose or eye.

While I have illustrated and described a specific embodiment of my invention, obviously various changes therein may be made without departing from my invention.

I claim:

1. A dispensing container for liquid comprising a vessel, a stopper sealing the top of said vessel, a tube piercing the bottom of said vessel terminating outside of said vessel in a constricted nozzle, and extending upwardly within said vessel nearly to said stopper, a bulb mounted on said stopper, and a second tube connecting said bulb through said stopper with the inside of said vessel, said last named tube extending downwardly freely around said first named tube nearly to the bottom of said vessel.

2. A dispensing container for liquid, comprising an elongated storage vessel, a stopper sealing the top of said vessel, a tube extending within said vessel and through the bottom of said vessel and terminating in a constricted nozzle, an elastic bulb mounted on said stopper, a second tube extending from the bulb to a point within the vessel surrounding said first mentioned tube and having an inner radius greater than the outer radius of the first mentioned tube to form an annular passage from the vessel to the first mentioned tube whereby liquid within said vessel may be withdrawn by suction from the storage vessel into the first named tube when external pressure of the bulb is alternately applied and released while at the same time the lower end of the first named tube is closed by gentle pressure.

3. A dispensing container, as claimed in claim 1 wherein a portion of said first named tube extending below said vessel and above said nozzle is scaled so that the amount of liquid discharged into said tube and held therein is volumetrically indicated.

4. A dispensing container, as claimed in claim 2, wherein a portion of said first named tube extending below said vessel and above said nozzle is scaled so that the amount of liquid discharged into said tube and held therein is volumetrically indicated.

5. A dispensing container for liquid, comprising an elongated storage vessel, a stopper sealing the top of said vessel, a tube extending upwardly within said vessel nearly to said stopper and downwardly through the bottom of said vessel and terminating in a constricted nozzle, an elastic bulb mounted on said stopper, a second tube connecting said bulb, through said stopper, with the inside of said vessel and extending downwardly around said first named tube nearly to the bottom of said vessel, there being sufficient clearance between said tubes to permit liquid within said vessel to be withdrawn by suction from the storage vessel into the first named tube when external pressure is applied to said bulb and a partial vacuum is created in said tube.

6. A syringe comprising a vessel containing liquid to be dispensed, a stopper sealing the top of said vessel, a tube piercing the bottom of said vessel and extending upwardly within said vessel nearly to said stopper and terminating outside said vessel in a constricted nozzle, a bulb mounted on said stopper, a second tube connecting said bulb through said stopper with said vessel, said last named tube extending downwardly around said first named tube nearly to the bottom of said vessel and being of such inside diameter that an annular passage is provided between said last named and said first named tubes whereby liquid contained in said vessel may be withdrawn into said first named tube and then be expelled therefrom by compression of said bulb.

IRVING SILVERMAN.

REFERENCES CITED

The following references are of record in the file of this patent:

UNITED STATES PATENTS

| Number | Name | Date |
|---|---|---|
| 941,489 | Beverly | Nov. 30, 1909 |